United States Patent
Scheel et al.

(10) Patent No.: US 6,917,531 B2
(45) Date of Patent: Jul. 12, 2005

(54) POWER SUPPLY SYSTEM

(75) Inventors: Thomas Scheel, Aachen (DE);
Christian Hattrup, Herzogenrath (DE);
Olaf Maertens, Hamburg (DE);
Thorsten Gercke, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/478,034

(22) PCT Filed: May 28, 2002

(86) PCT No.: PCT/IB02/01888
§ 371 (c)(1),
(2), (4) Date: Nov. 17, 2003

(87) PCT Pub. No.: WO02/097957
PCT Pub. Date: Dec. 5, 2002

(65) Prior Publication Data
US 2004/0125624 A1 Jul. 1, 2004

(30) Foreign Application Priority Data
May 29, 2001 (DE) .......................... 101 26 256

(51) Int. Cl.$^7$ ................................ H02M 3/24
(52) U.S. Cl. ................ 363/97; 363/21.02; 363/71
(58) Field of Search .................... 363/65, 67, 71, 363/97, 98, 131, 132, 15, 16, 21.02, 95

(56) References Cited

U.S. PATENT DOCUMENTS

| 5,272,612 | A | 12/1993 | Harada et al. |
| 5,731,968 | A | 3/1998 | Van Der Broeck et al. |
| 6,072,856 | A | 6/2000 | Van Der Broeck et al. .. 378/101 |
| 6,351,401 | B1 | 2/2002 | Scheel et al. |
| 6,738,275 | B1 * | 5/2004 | Beland ........................ 363/71 |

OTHER PUBLICATIONS

Nakaoka, M., et al.; The state of the art phase-shifted ZVS-PWM series and parallel resonant DC-DC power converters . . . ; IEEE Proceedings, Toledo, Jun., 1992; pp. 62-70.

* cited by examiner

*Primary Examiner*—Gary L Laxton
(74) *Attorney, Agent, or Firm*—Fay, Sharpe, Fagan, Minnich & McKee LLP

(57) ABSTRACT

Two proposals are made for power supply systems comprising at least one resonant inverter and one control unit. According to the first proposal the power supply system comprises two inverters and produces two output voltages, the control circuit processing as an actual value on the one hand the sum of and on the other hand the difference between the two output voltages. According to the second proposal a control circuit does not directly process the controlled variables for a power supply system comprising at least one inverter, but difference units for controlled variables determine the deviations from a preceding sampling instant and these difference values are processed. Also the correcting variable calculated in this way is a difference value which is converted into a correcting variable value by a correcting variable summing unit. The two proposals can be advantageously combined. As an important improvement is proposed the use of a limiting controller which generally becomes active in case of imminent transgression of a maximum value and which limits the actuation. The control circuit is preferably used as a digital control circuit for a state space control.

11 Claims, 7 Drawing Sheets

POWER SUPPLY SYSTEM

Figure 1:
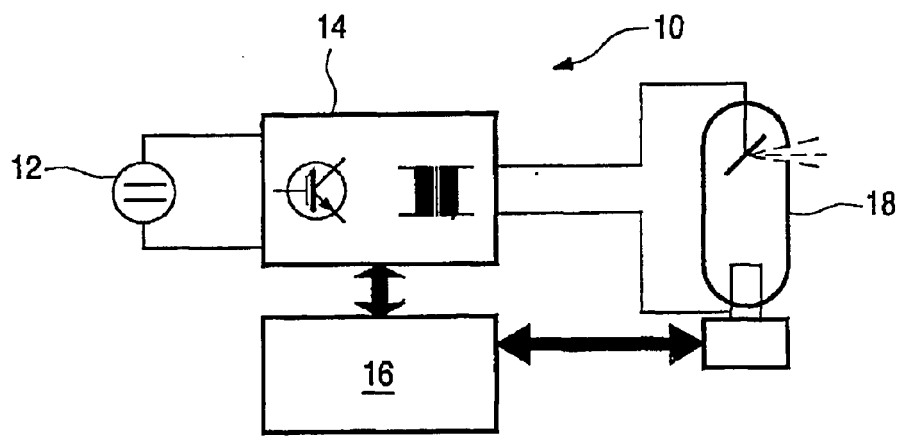

Controlled switched-mode power supplies are known as power supply systems. Such switched-mode power supplies include an inverter controlled by a control device for generating a switched inverter output voltage. The inverter output voltage is up-converted or down-converted by a transformer depending on the output voltage needed by the consumer. If the consumer needs a DC voltage supply, the output voltage generated on the secondary side of the transformer is rectified and smoothed as required.

Such switched-mode power supplies are often arranged as "resonant converters" i.e. the inverter supplies power to a resonant circuit formed by at least one capacitance and one inductance. In many cases no separate component is provided as an inductance, but the resonant circuit is formed by the leakage inductance of the primary winding of the transformer and a resonant capacitance.

A control circuit controls the output voltage and utilizes the driving of the inverter as a correcting variable. The inverter has controlled switches to generate a switched AC voltage from a supply voltage (intermediate circuit voltage). The control circuit normally operates on such a switching frequency, so that the frequency of the converter output voltage is in the range of the resonant frequency of the resonant circuit fed by it, preferably even exactly corresponds thereto. In known control circuits the inverter is driven so that the inverter output voltage is a pulse-width modulated voltage with a fixed frequency, while the duty cycle is used as a correcting variable for the control of the output voltage.

A power supply system comprising a series of resonant converter with a control circuit for controlling its output voltage is described in U.S. Pat. No. 6,351,401. An inverter then feeds a series resonant circuit formed by a resonant capacitance and an inductance, while a primary-side leakage inductance of a transformer is involved. The secondary-side voltage of the transformer is rectified and smoothed so as to generate an output DC voltage. The control circuit processes actual values depending on the output voltage and on the primary-side current and produces a correcting variable which determines the duty cycle of the inverter. This is a digital control circuit with an adjustment in the state space.

High-voltage supplies with a highly accurate control are necessary particularly for X-ray generators. Such a power supply system is also described in U.S. Pat. No. 6,072,856. This power supply system for an X-ray generator is particulary arranged for operation both in a first operating state with high short-time power (X-ray) and in a second operating state with low long-time power (radioscopy). For this purpose it includes a special inverter which has means for switching between the two operating modes, so that in the second operating mode versus the first operating mode an auxiliary resonance circuit becomes active which is connected in series to the resonant circuit fed by the inverter. This auxiliary resonant circuit is preferably formed by an auxiliary inductance and an auxiliary capacitance.

Also in U.S. Pat. No. 5,731,968 is described an X-ray apparatus with a power supply system. For this purpose a special transformer is used having two primary and two secondary windings, each of the primary windings being fed by an inverter. Primary and secondary windings are assigned to each, other, assigned windings having a stronger coupling than windings not assigned to each other. The inverters are driven so that they are operated with a fixed frequency, the power on the secondary side being adjusted via the duty cycle.

It is an object of the invention to propose a power supply system with a control circuit adapted to the structure of the power supply system, so that the control circuit can accurately adjust the output voltage of the power supply system.

This object is achieved by a power supply system as claimed in claim 1 comprising a special control circuit for adjusting a system that includes at least two inverters and a power supply system as claimed in claim 7 including a control circuit that works with difference values. Dependent claims relate to advantageous embodiments of the invention.

In accordance with the first proposal of the invention (claim 1) a power supply system comprises at least two inverters and at least one transformer fed by the inverters. Preferably a multi-winding transformer is used which has on its primary side two windings (one with a middle tap for potential-separated inverters) for the connection of the first and second inverters and on the secondary side at least two output windings (here too one with a middle tap). In the preferred transformer all windings are provided on a common transformer core. The transmission behavior of this transformer shows a clear coupling of the first primary winding with the first secondary winding as well as the second primary winding with the second secondary winding. However, there is also "cross-over" voltage transfer from the first primary winding to the second secondary winding and from the second primary winding to the first secondary winding, which voltage transfer is not negligible.

The invention is based on the recognition that for the highly accurate control with a still simple structure of the controller it is an advantage when two actual values are processed instead of the directly controlling the output voltage, the first of these two actual values depending on the sum and the second of these two actual values depending on the difference between the two output voltages. By "depending" is meant here that the actual value is computed from the sum or difference respectively of the voltages. The two actual values preferably directly correspond to the sum or difference, respectively, it is true, but in variants, additional mathematical operations can be applied to the values, for example, multiplication by a constant factor.

The control circuit of the power supply system may be realized in highly different forms. It is preferably a digital controller that is realized as a circuit including a microprocessor or signal processor which processes sample values. Corresponding realizations of digital control circuits are known to a man of ordinary skill in the art. The computation of the first and second actual value from the output voltages may be performed by a separate unit for signal pre-processing unit, but the computation of the actual values is preferably performed inside a microprocessor circuit that performs a digital control algorithm.

The control circuit produces driving magnitudes as correcting variables for the inverters. The inverters have each a number of switches for generating a switched inverter output voltage. The driving magnitudes are predefined values for the respective switch positions at a particular instant. A power supply system preferably works with a fixed switching frequency, which substantially corresponds to the natural frequency of the resonant circuit fed by the inverter. In case of a fixed frequency the control circuit can supply a certain driving value determining the duty cycle of the generated inverter output voltage as a driving magnitude, for example, the pulse duration or a value from which the pulse duration is calculated.

The control circuit then preferably does not calculate this value for the first or second inverter directly, but the sum and difference of the values for the first and second inverters. In a downstream signal processing (which, however, can also be performed in practice by the digital control circuit) the actual driving values are computed from the sum or difference values.

The control circuit in a further embodiment processes a set value for the sum of the two output voltages and drives the inverters so that the sum of the two output voltages is adjusted to the set value. At the same time, the difference between the two output voltages is adjusted to a difference set value, preferably to zero.

According to a further embodiment of the invention the control circuit processes not only a first and a second, but also a third and a fourth actual value. The third and fourth actual values depend on the primary-side resonant currents, thus on the currents flowing through the resonant circuits fed by the inverters. These currents are measured. The third and fourth actual values are calculated from these currents for which various mathematical operations are required. The measured values for the currents may directly form the third and fourth actual values. A parameter for the respective resonant capacitance voltage is preferably formed from the currents by integration and subsequent value generation. The third actual value is then calculated in dependence on the sum of the thus calculated resonant capacitance voltages and the fourth actual value on the difference between the resonant capacitance voltages. In a very simple embodiment the third and fourth actual values directly correspond to the sum or difference, respectively, of the resonant capacitance voltages. The necessary signal pre-processing i.e. the use of a mathematical function for the measured values of the primary-side resonant currents, is again preferably performed by the digital control circuit itself.

The power supply system according to the second proposal of the invention (claim 7) has in its simplest embodiment only one inverter and one inverter-fed resonant circuit formed by a transformer and a resonant capacitance. The control circuit according to the invention is provided for processing difference values of controlled variables and delivering difference values of correcting variables. The difference values of controlled variables processed by the control circuit are produced by a controlled variable difference unit. This unit processes sample values of the controlled variable (for example, output voltage) and calculates a controlled variable difference value. This difference value depends on the difference between the value of the respective controlled variable at the current instant and the corresponding value at at least one earlier instant. The calculated controlled variable difference preferably directly corresponds to the difference between the actual sample value and the previous sample value, but depending on the embodiment also more values can be taken into account for the formation of the difference and still further mathematical operations can be used for calculating the difference.

According to the invention the control circuit also produces as a correcting variable first a correcting variable difference from which the current correcting variable is formed with the aid of a correcting variable summing unit by continuous summing of the correcting variable differences (and further operations as required, such as multiplication by a factor).

As already described above, the control circuit and the difference and summing units may be realized very differently, preferably it is a microprocessor circuit in which all these functions are performed computer controlled.

The transition from a direct control of the controlled variable to consider difference values has particular advantages in systems in which the parameters of the control path and/or of the controller are not constant. For example, in power supply systems for X-ray tubes are to be taken into account two highly different operating modes, a "high power" and a "low power" operating mode. To guarantee an optimum control in the two operating modes that may be provided that the actual controller (designed, for example, as a digital controller) works with various parameter sets for the various operating modes. To realize a very smooth transition from one parameter set to another when switching takes place between the two operating modes, the "difference structure" has proved to be highly advantageous. When the parameter set of the controller is exchanged, the value of the correcting variable is steady.

This property of the control according to the invention can very much be used to advantage when the inverter or inverters of the system already have means for switching between the operating modes. The difference control according to the invention may thus be applied highly advantageously to a power supply system that comprises one or more inverters such as described in EP 0 884 830, that is to say, in a second operating mode, contrary to a first operating mode, a further series inductance is active at the output of the inverter in addition to the resonant circuit.

The two proposals that can be realized separately as claimed in claims 1 and 7 may pre-eminently also be combined. In a system comprising a plurality of inverters, difference values are then formed for one, various or all correcting variables (i.e. driving values for the inverters, for example, duty cycle), which difference values are converted into the actual correcting variable values by summing units. In such an embodiment, several mathematical operations are first to be applied to the value the actual controller produces as a correcting variable to obtain the actual driving value (for example, duty cycle) for an inverter concerned, among which operations are summing (for the transition from the processed (time) difference values to the absolute values) and formation of sum and difference (for the transition from the sum and difference values concerned to the values for the inverters concerned).

Also on the input side of the controller i.e. with the controlled variables, a combination of the two proposals is wise and advantageous. Controlled variable difference units can then determine the (time-dependent) difference values of controlled variables for an individual or various, preferably all the controlled variables (sum and difference of the output voltages or also sum and difference of the resonant currents or resonant capacitance voltages).

In view of the multitude of correcting and controlled variables to be taken into account, it has proved to be highly advantageous to make the control circuit a digital control circuit for a state space control. For this purpose methods known per se for the design of controllers, for example, the method of pole positioning may be used to obtain a controller that has the desired properties. Preferably, no less than two parameter sets are calculated for such a controller, that is to say, for the high and the low power operating modes. The parameter sets may then be exchanged when the modes are changed over.

According to a further embodiment of the invention a power supply system additionally includes means for limiting the primary-side resonant current. This has proved to be advantageous particularly for power supply systems for X-ray apparatus. When such a power supply system is "powered up", the predefined output voltage is to be reached within the shortest time and under precisely defined marginal conditions. It has proved that care should be taken for the primary-side resonant current not to become too high.

As a possible means for limiting the primary-side resonant current is proposed an additional limit controller. Instead of predefining a fixed extreme value for a controlled variable, the limit controller at any instant calculates such an extreme value as a safety limit based on measured magnitudes of the system. The limit controller is supplied with the values for one, several or all magnitudes of the system from which a value is calculated for at least one of the correcting variables, which represents a maximum or minimum value for this controlled variable, whereas too high a primary-side resonant current is to be feared when this value is transgressed or fallen short of. This additional limit control is inserted into the overall system in which a minimum or maximum unit compares for the respective correcting variable the correcting variable value calculated by the actual control structure and compares the maximum or minimum value, respectively, found by the limit controller and lets only the maximum or minimum of these values become effective as a correcting variable unity. In this way it is not necessary to intervene in the rest of the controller structure as long as the value for the primary-side resonant current is not alarming. But the moment when this controller structure would predefine a controlled variable that would be alarming in view of the primary-side resonant current, a limitation of the correcting variable supplied by the limiting controller would occur.

These and other aspects of the invention will be apparent from and elucidated with reference to the embodiments described hereinafter.

Figure 2:
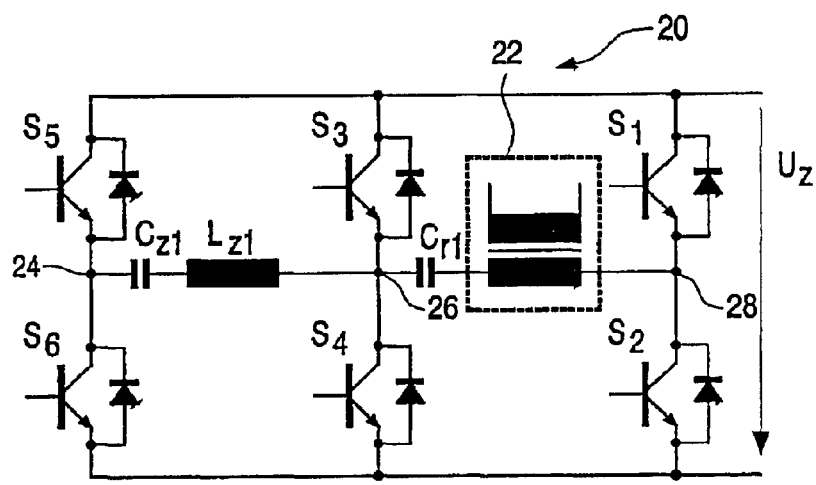
Figure 3:
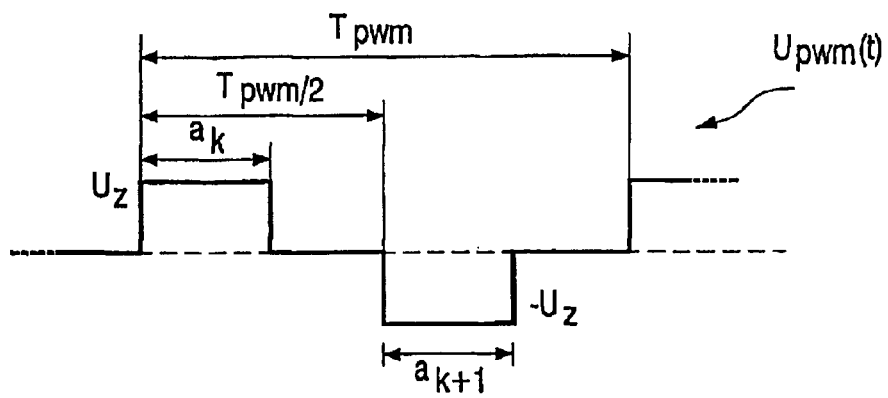
Figure 4:
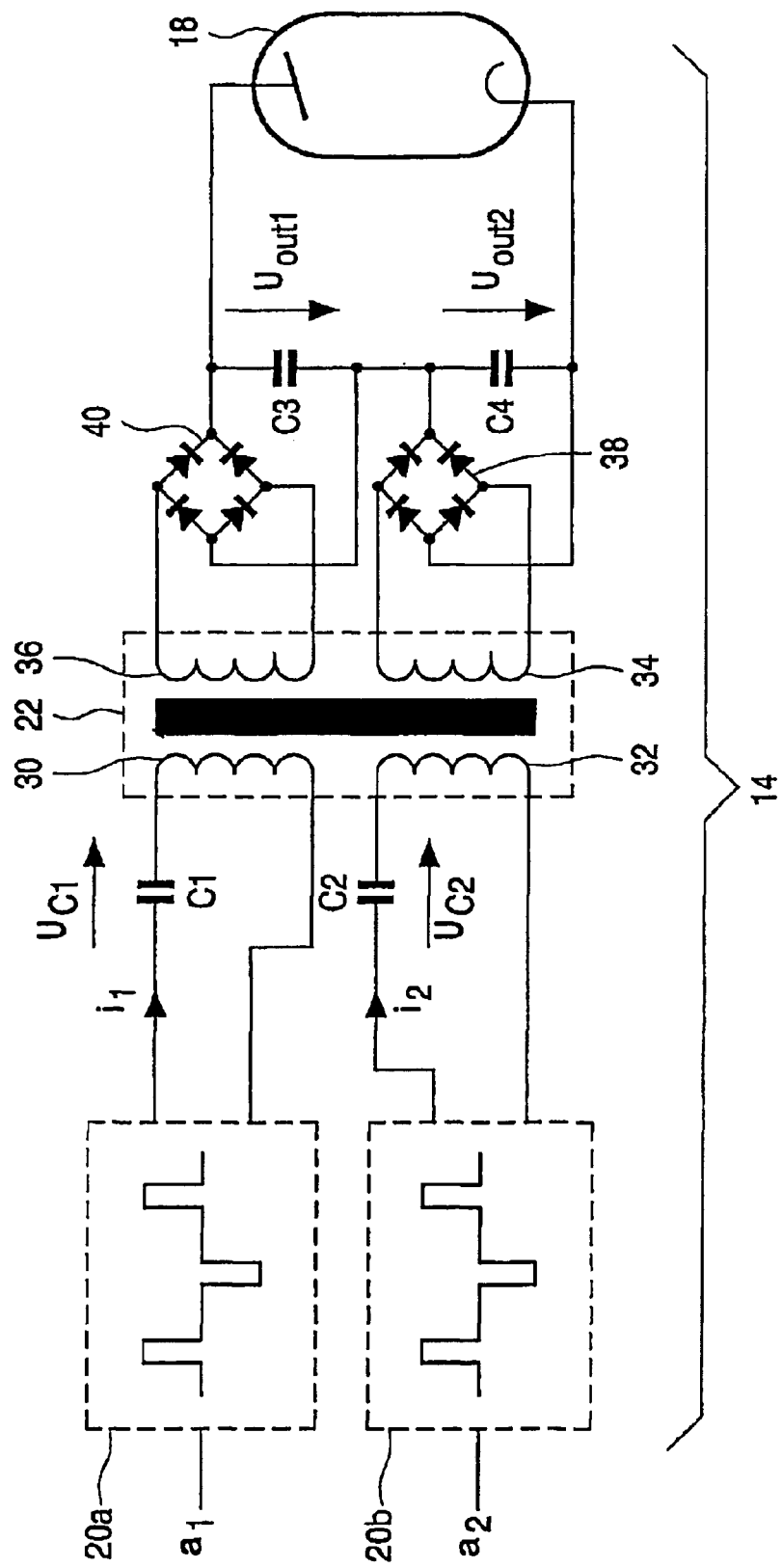
Figure 5:
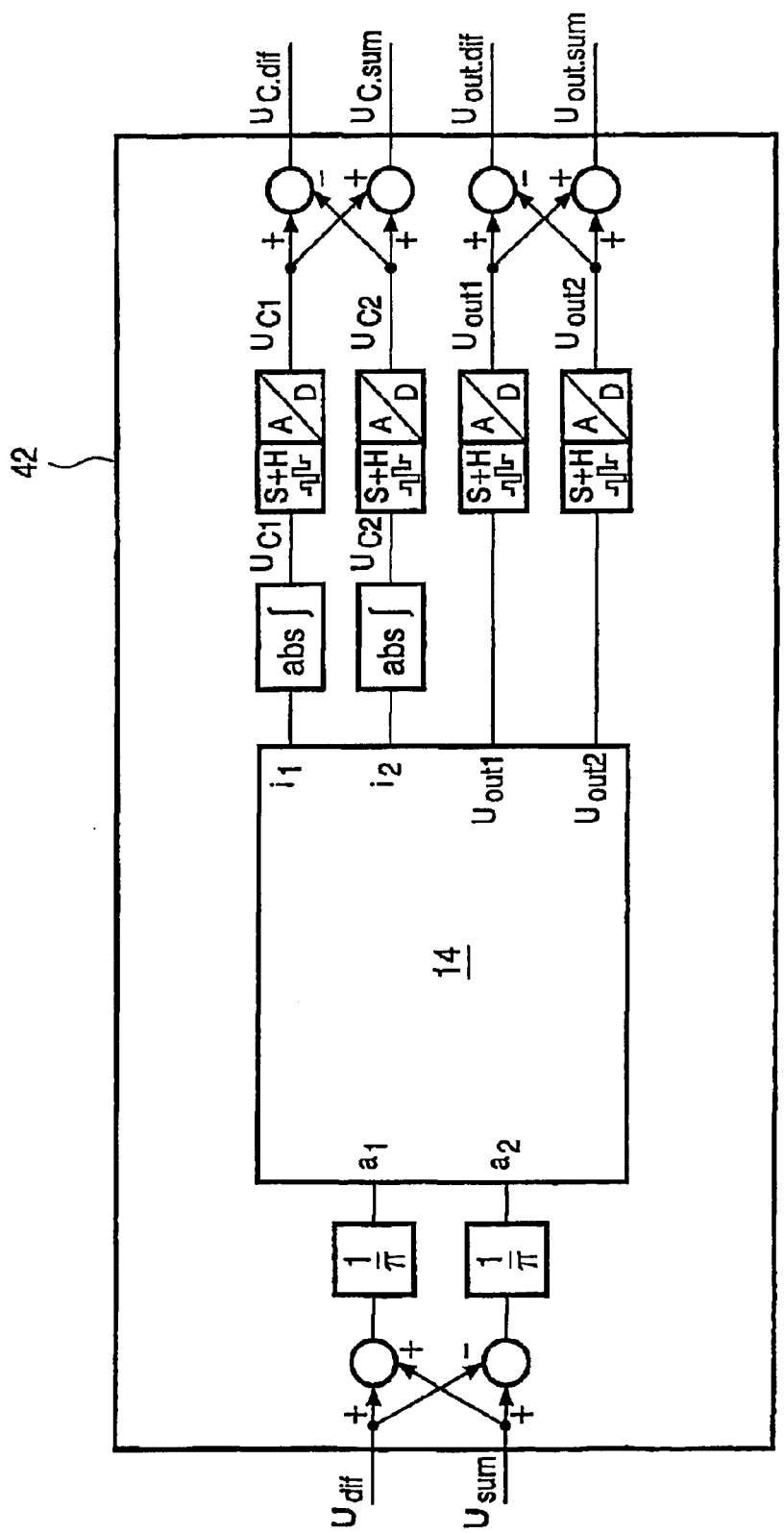
Figure 6:
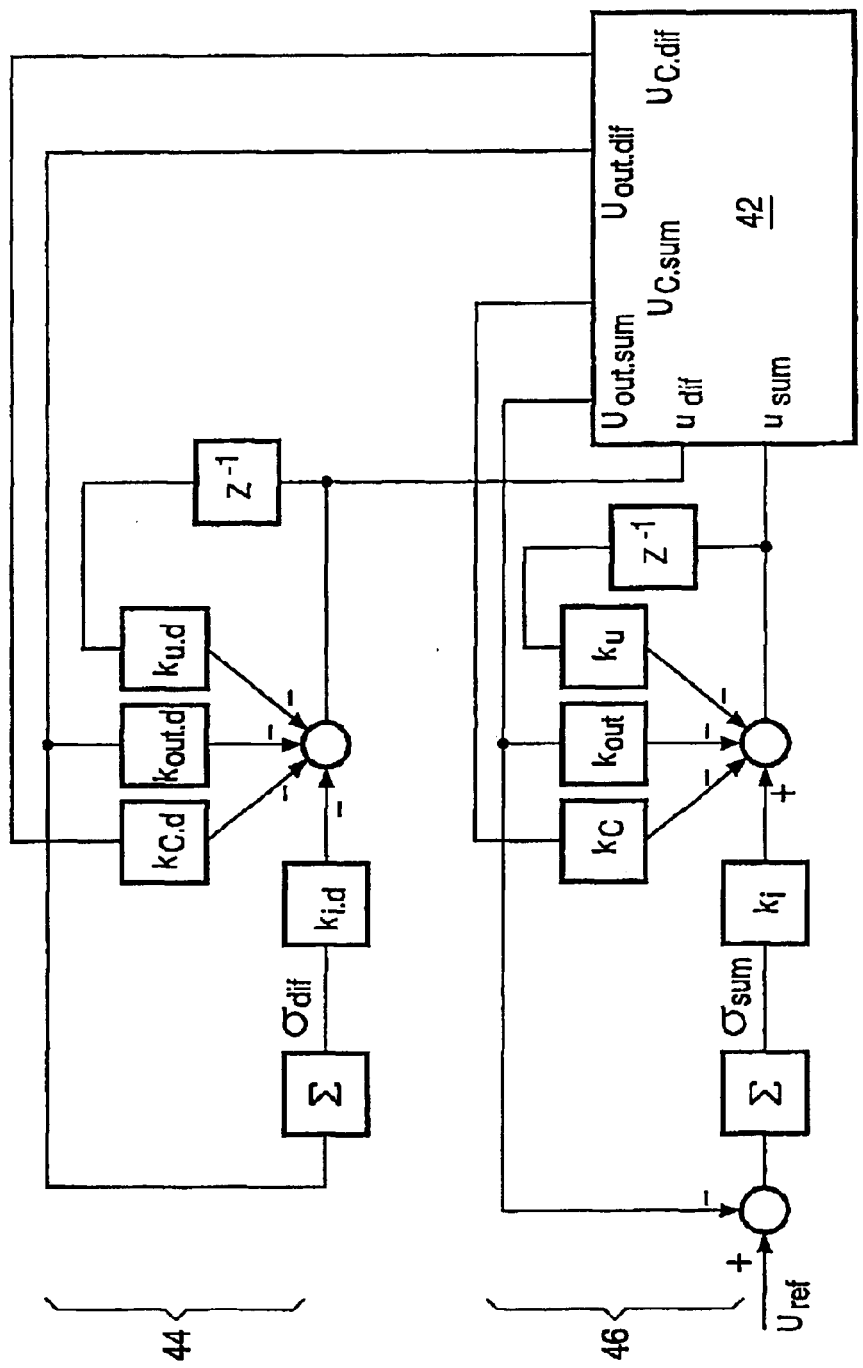
Figure 7:
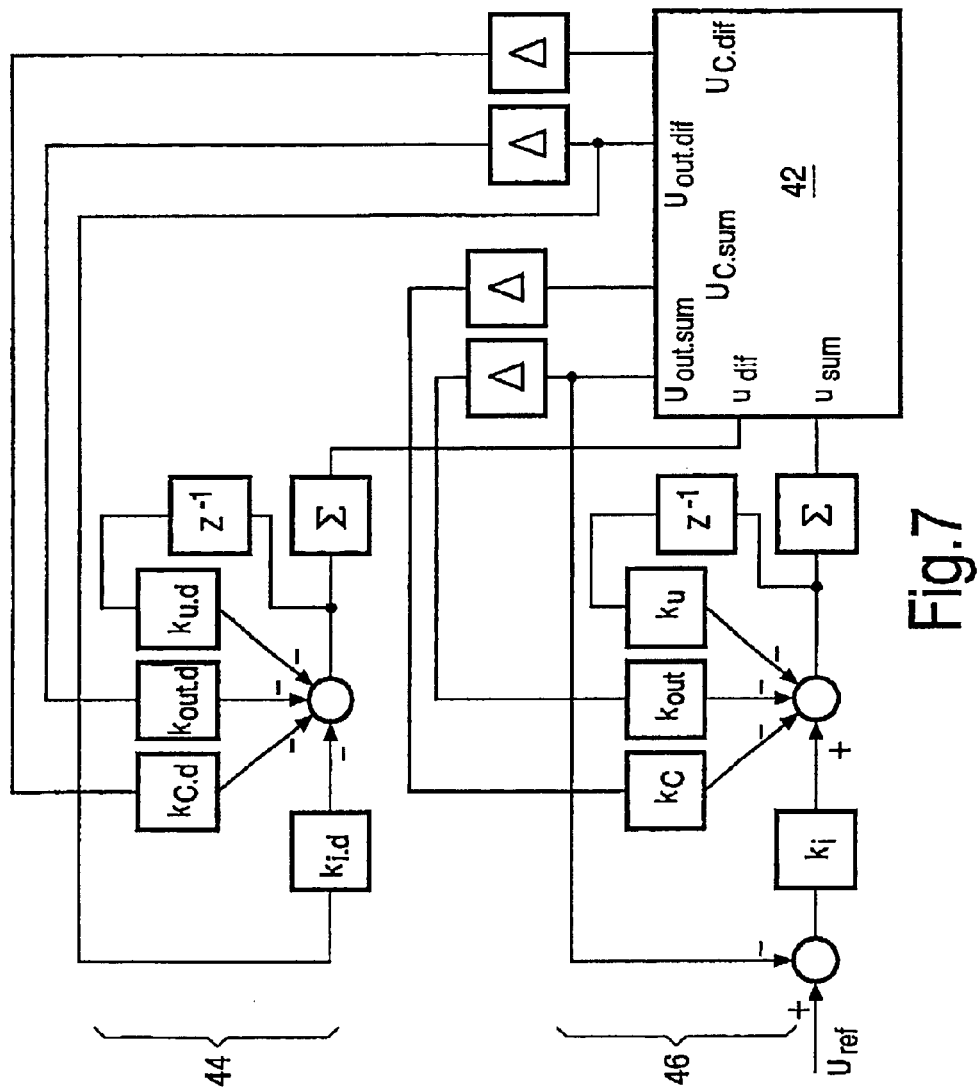
Figure 8:
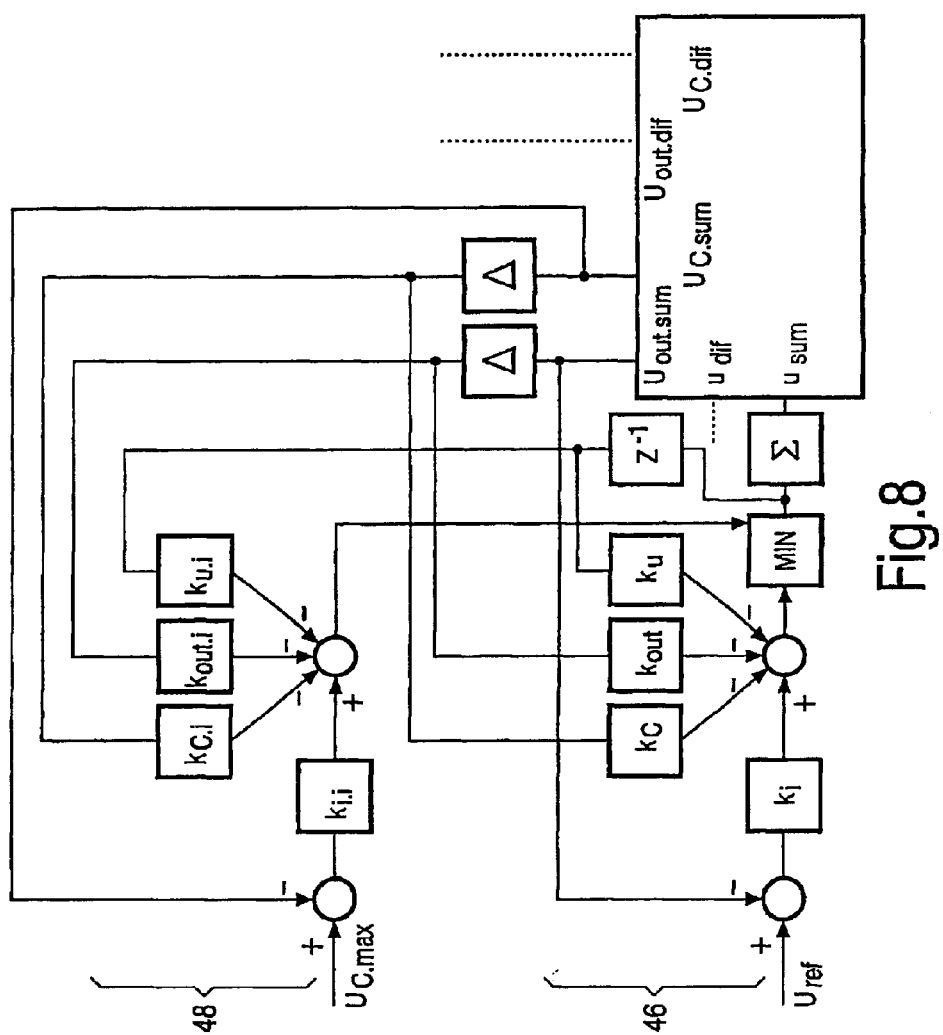
Figure 9:
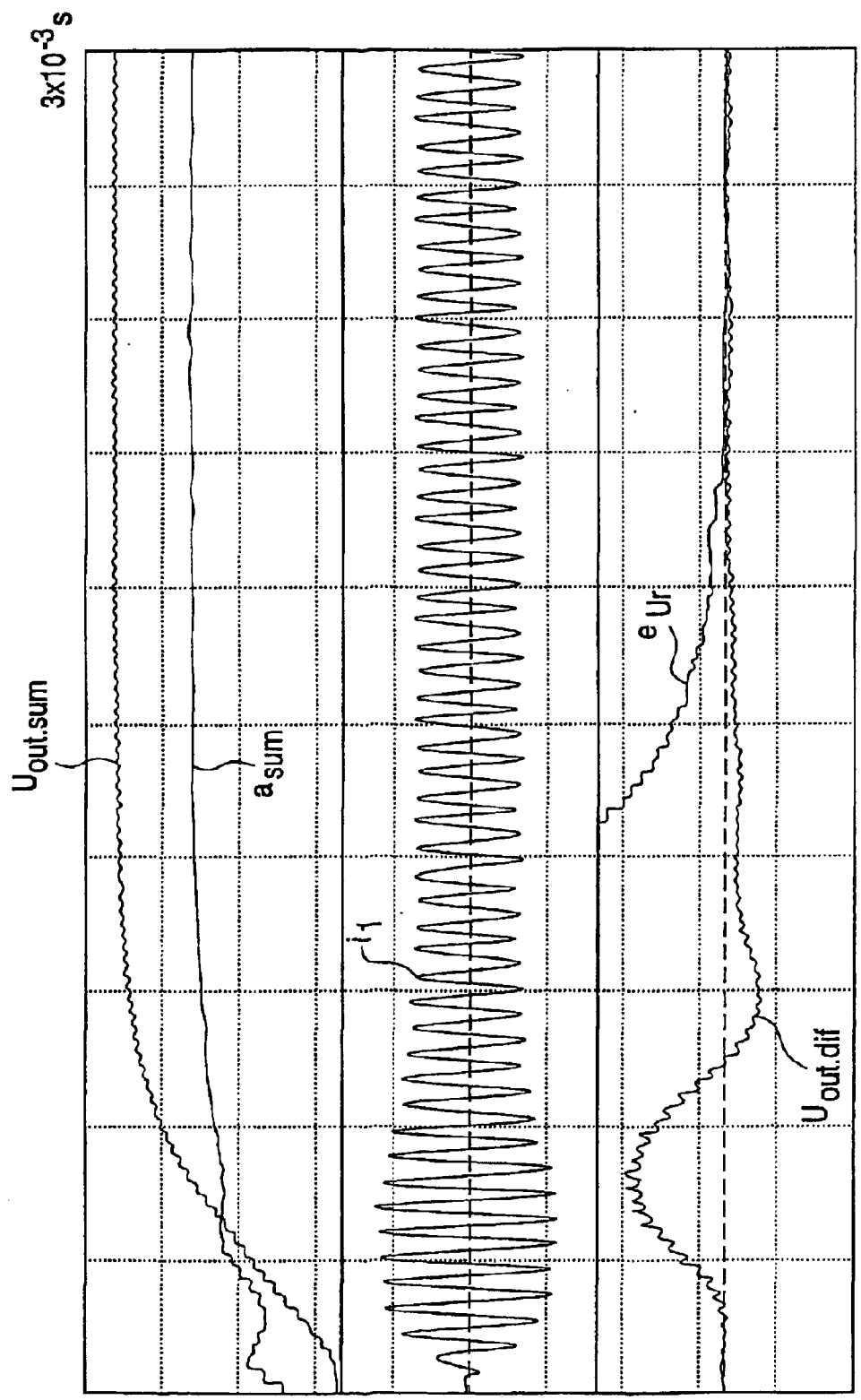

In the drawings:

FIG. 1 gives a diagrammatic representation of the modules of an X-ray apparatus;

FIG. 2 shows a circuit diagram of an inverter;

FIG. 3 gives a diagrammatic representation of the waveform of a pulse-width modulated voltage;

FIG. 4 shows a part of a current supply system for an X-ray tube;

FIG. 5 gives a diagrammatic representation of a signal pre-processing and post-processing unit;

FIG. 6 gives a diagrammatic representation of a first embodiment of a controller;

FIG. 7 gives a diagrammatic representation of a second embodiment of a controller;

FIG. 8 gives a diagrammatic representation of a part of a third embodiment of a controller; and FIG. 9 shows a diagram representing the waveform of several magnitudes of the control.

FIG. 1 shows in a diagrammatic representation an X-ray apparatus 10 with its assemblies. A DC voltage supply, represented as a voltage source 12, supplies an intermediate circuit voltage to a power supply 14. The power supply 14 is controlled by the control device 16 so that it supplies a controlled high voltage to an X-ray tube 18. The microprocessor-controlled circuit 16 controls the function of the power supply 14 and also controls the cathode heating of the X-ray tube 18 as well as further functions of the apparatus 10.

The power supply 14 comprises an inverter for generating a switched AC voltage from the intermediate circuit voltage. The primary side of the transformer is fed with this switched AC voltage. The inverter is controlled by the control unit 16.

FIG. 2 shows a circuit diagram of the primary side of a power supply 14 comprising an inverter 20 and a transformer 22. The inverter 20 includes controlled switches S1, S2, S3, S4, S5, S6 which are realized in this case by transistors bridged by freewheeling diodes. The inverter is operated with an intermediate circuit voltage $U_Z$. Depending on the switches S1 to S6 being driven, different output voltages can be generated on the output terminals 24, 26, 28 of the inverter 20.

Many options of inverter topologies are known to the man of ordinary skill in the art. The special form of an inverter shown in FIG. 2 is described in detail in U.S. Pat. No. 6,072,856. This is a special inverter which is suitable for the change between a first operating mode with high short-term power and a second operating mode with low long-term power. In the first operating mode the switches S1, S2, S3, S4 are active, so that the resonant circuit comprising a resonant capacitance $C_{r1}$ and the primary side of the transformer 22 and connected between the output terminals 26, 28 is supplied with a switched AC voltage. In the second operating mode (low continuous output), the switches S5 and S6 instead of S3 and S4 are active together with S1 and S2, so that one more series inductance $L_{z1}$ and a further resonant capacitance $C_{z1}$ is active in series with the resonant circuit formed by $C_{r1}$ and the transformer 22.

The switches S1 to S6 are driven by the control unit 16 in that a pulse-width modulated voltage is generated between the output terminals 26 and 28 (first operating mode) and 24 and 28 (second operating mode).

FIG. 3 shows the basic waveform of the pulse-width modulated voltage $u_{pwm}(t)$. The fixed period duration of the pulse width modulation is referred to as $T_{pwm}$ here. When a fixed period duration $T_{pwm}$ is selected, also the switching frequency $f_{pwm}=1/T_{pwm}$ is constant whose value is set to the resonant frequency that results from the inductance L and the capacitance C. In consequence, the resulting current is approximately sinusoidal for large load currents and is in phase with the pulse-width modulated voltage $u_{pwm}(t)$. In the first half of the period shown the rectangular pulse of length $a_k$ and positive height $U_Z$ assigned to a sampling point k is present. For the rest of the first period half the voltage $u_{pwm}(t)$ equals zero. In the second half of the period shown $T_{pwm}$, a rectangular pulse of length $a_{k+1}$ and negative height $-U_Z$ is present at a sampling instant k+1. For the rest of the second period half the voltage $u_{pwm}(t)$ also equals zero. The respective values of $a_k$, $a_{k+1}$, . . . and the period duration $T_{pwm}$ unambiguously determine the respective current duty cycle of the pulse-width modulated voltage $u_{pwm}(t)$.

FIG. 4 shows the power supply 14 as an electricity power supply for the X-ray tube 18 once more in detail. Two inverters 20a, 20b are shown symbolically which each feed a resonant circuit in the form of a resonant capacitor C1, C2 and either of the two primary windings 30, 32 of the transformer 22. Resonant currents i1, i2 then flow while resonant capacitance voltages $u_{C1}$, $u_{C2}$ then build up at the resonant capacitances C1, C2.

The transformer 22 has two primary windings 30, 32. Together with secondary windings 34, 36 they are wound around a common transformer core. The transmission behavior of the transformer 22 is then such that there is a particularly strong coupling between the first primary winding 30 and the first secondary winding 36 and between the second primary winding 32 and the second secondary winding 34. Despite this, there are non-negligible cross-over couplings i.e. from the first primary winding 30 to the second secondary winding 34 and from the second primary winding 32 to the first secondary winding 36. This special embodiment of the transformer 22 is advantageous in that the transformer can also be operated with only one inverter (with parallel-connected primary windings). The ratio of the primary-side to the secondary-side number of windings is 1:250.

The power supply of FIG. 4 and, mor particularly, the transformer 22 are described in detail in U.S. Pat. No. 5,731,968. The embodiments thereof for the construction of the transformer 22 and the driving of theinverters 20a, 20b are expressly referred to here.

The secondary-side output voltages on the secondary windings 34, 36 are rectified by bridge rectifiers 38, 40 and smoothed by smoothing capacitors C3, C4. Consequently, there are output voltages $u_{out1}$, $u_{out2}$ which are connected in series, so that the sum $u_{out1}+u_{out2}$ forms the supply voltage to the X-ray tube 18. For control purposes, measuring devices are provided for the two output sub-voltages $u_{out1}$, $u_{out2}$ and the primary-side resonant currents i1, i2.

FIG. 5 shows as a signal flow diagram the signal processing upstream and downstream of the controller. The power supply itself as shown in FIG. 4 is represented only symbolically here as block 14. The drive of the two inverters 20a, 20b is effected at any instant with predefined pulse widths a1, a2. During operation the magnitudes i1, i2, $u_{out1}$, $u_{out2}$ are measured.

The actual controller, however, does not directly work with these measured controlled variables. The primary-side resonant currents i1, i2 are first recalculated via integration and subsequent formation of the value into the primary-side resonant capacitance voltages $u_{C1}$, $u_{C2}$. They are sampled by a sample-and-hold unit and digitized by an analog-to-digital converter, so that digital sample values $U_{C1}$, $U_{C2}$ are present at any instant k. The integration is preferably effected by an integration circuit but as an alternative it is also possible to first have a sampling and then a subsequent computational integration. The sampling is effected in synchronism with the pulse-width modulated signal, so that the maximum of the resonant capacitance voltages is sampled and is present as a digital value which represents an estimate for the amplitude of the resonant capacitance voltages $U_{C1}$, $U_{C2}$. The voltages $u_{out1}$, $u_{out2}$ are sampled and digitized in similar fashion, so that here too digital sample values $u_{out1}$, $u_{out2}$ are present at any instant k.

The sums and differences are formed from the values thus obtained for $U_{C1}$, $U_{C2}$, $U_{out1}$ and $U_{out2}$.

$$U_{C,dif}=U_{C1}-U_{C2}$$

$$U_{C,sum}=U_{C1}+U_{C2}$$

$$U_{out,dif}=U_{out1}-U_{out2}$$

$$U_{out,sum}=U_{out1}+U_{out2}.$$

The control path 14 together with the signal pre-processing and post-processing forms the block 42. The actual controller now completely works in the range of the sum or difference value respectively, produced by this block 42. The controller also produces as a correcting variable not directly the values $u=\sin(\pi a)$ to determine the pulse width a and thus the duty cycle, but here too the values are delivered for the sum and difference of the values u1 and u2 for the first and second inverters 20a, 20b. These values are recalculated by a signal post-processing into the values for the pulse widths a1, a2 of the inverters 20a, 20b. Since small duty cycles a of less than 0.3 can be used, the function $u=\sin(\pi a)$ can be approximated by the linear function $u=\pi a$.

Now comes the design of the actual controller. FIG. 6 shows the controller structure in which two independent controllers 44, 46 are provided for the tube voltage $U_{out,sum}$ and the difference voltage $U_{out,dif}$.

The first controller 44 shown at the top in FIG. 6 produces the correcting variable $u_{dif}$, while it processes the controlled variables $U_{out,dif}$ and $U_{C,dif}$. The set value for the difference voltage is zero i.e. the first controller 44 tries to adjust the difference of the output voltages to zero.

The controller 46 shown at the bottom in FIG. 6 processes the sum voltages $U_{out,sum}$ and $U_{C,sum}$ and produces $u_{sum}$ as a correcting variable. A set value $U_{ref}$ is applied to the controller 46 which produces such a correcting variable that the output sum voltage $U_{out,sum}$ is adjusted to the set value.

The structure of the two controllers becomes evident from the diagram of FIG. 6. The correcting variable is formed as a sum of the controlled variables fed back and multiplied by respective factors k and the control deviation a also multiplied by a factor. Constant control deviations are eliminated by the summing blocks (corresponds to a discrete integration). In the two controllers also the produced correcting variables $z^{-1}u$ are fed back for additional smoothing.

For the design of a controller in accordance with FIG. 6, the method of pole positioning can be used. The reduced fourth-order system matrix which is determined with a non-linear reference model according to the mean square error method, is quasi diagonal and has two second-order diagonal blocks. Consequently, the design of the controller can be divided completely into the design of the sum controller 46 and of the difference controller 44.

The discrete integrator can be taken into consideration in the design of the controller in that the second-order state space model is extended to a third-order state space model. The additional state is the value of the integral or sum σ, respectively.

For the design of the controller it is very important that the measuring values $U_C$ and $U_{out}$ are not the actual values of the state space model, but values delayed by one sample period. Therefore it is advantageous for a state space model to be used for the design of the controller, which implies time delays. The delay of the measuring values is equivalent to the delay of the input variables u.

The power supply system is to be operated in two different modes of operation, the high power (HP) and the low power (LP) mode. The behavior in the LP mode differs considerably from the behavior in the HP mode. Therefore, the controllers have different parameters for the two operating modes. For both operating modes the respective parameter sets are calculated in advance and stored so that a switchover between the operating modes can be effected by exchanging the parameter sets. To make a smooth transition possible from one parameter set to another it is wise to change the structure of the controller in a way that the output value produced by the controller is not the correcting variable u itself but its deviation from the previous value u. In this way the correcting variable u is not steady when the parameter set of the control is changed.

The structure of a corresponding second embodiment of a controller is shown in FIG. 7. The control parameters are identical with those of FIG. 6. The difference units featured by the Δ sign work with the digital sample values at any instant, so that they subtract the sample value of the previous sampling instant from the sample value at the current instant.

The values thus formed are applied as input values to the difference controller 44 and the sum controller 46. Only the value for the output voltage ($U_{out,sum}$, $U_{out,dif}$) is additionally used once more i.e. without forming a difference. The sum controller subtracts this value from the set value to determine the control deviation; with the difference controller this value directly corresponds to the negative control deviation since after all the difference is to be adjusted to zero.

FIG. 8 shows the controller structure of a third embodiment of a controller in which an additional limit controller 48 is provided. For the rest the controller structure of FIG.

8 largely corresponds to that of FIG. 7 so that the structure as such need no longer be explained. The difference controller 44 of FIG. 7 is also shown in FIG. 8, but not shown separately this time. The difference inside the sum controller 46, that is the insertion of a minimum unit will be explained separately.

The limit controller 48 has for its object to limit the primary-side resonant currents i1, i2. This is realized by a limitation of the resonant capacitance voltages $U_{C1}$, $U_{C2}$. This represents a still sufficiently exact approximate since in this case the amplitude of the resonant capacitance voltage is proportional to the amplitude of the resonant current.

The limit controller 48 receives as a set value $U_{c,max}$ the maximum sum of the resonant capacitance voltages. The limit controller 48 works as a state controller with an integral portion which predefines a drive $U_{sum}$, so that the resonant capacitance voltage is adjusted to a predefined maximum value.

The "Min-block" provided inside the sum controller 46 in FIG. 8 contrary to FIG. 7 provides that the drive value produced by the limit controller 48 becomes effective only when the sum controller 46 would predefine such a drive value $u_{sum}$, so that a transgression of the maximum voltage $U_{c,max}$ would be feared. The "Min-Block" provides that in the two controllers 46, 48 always the controller producing the smaller duty cycle is active. Since the limit controller 48 predefines such a duty cycle that the resonant capacitance voltage is adjusted to its maximum value, the value $u_{sum}$ predefined by the sum controller 46 is smaller in normal operation (within the specification), so that the limit controller 48 is not active in the system. Only in the case where the sum controller 46 would drive the inverters 20a, 20b too strongly, this drive is limited by the limit value predefined by the limit controller 48.

For the design of this controller also the state space model is used. Starting point for the sub-model is a sum system. The same state space model is also valid for the differences of the state space variables between the sampling instants k and k−1.

The state space equation may be used to determine the maximum permitted $\Delta u_k$.

The whole system has a fourth-order system behavior. To control the resonant capacitance voltage independently of the output voltage, it is suitable for the resonant capacitance voltage to adopt a third-order behavior. The general dynamic behavior of the resonant capacitance voltage in the case of limitation should therefore be:

$$U_{C,k+1}+(f_1-1)U_{C,k}+f_2 U_{C,k-1}+f_3 U_{C,k-2}=(f_1+f_2+f_3)U_{max}$$

with the variable parameters $f_i$.

To determine the necessary control parameters for FIG. 8, certain dynamic poles $z_1$, $z_2$, $z_3$ of the system are used. From these poles can be calculated the parameters $f_1$, $f_2$, and $f_3$ and the controller parameters can be determined from them.

For the check of the controller design, first a simulation was performed. The result is shown in FIG. 9. FIG. 9 shows the timing diagram of several magnitudes of the system in the time range t=0s to t=3*10$^{-3}$ s. The magnitudes shown represent an operating point with a voltage of 150 kV and 660 mA.

The upper part shows the output voltage $U_{out,sum}$ and the duty cycle $a_{sum}$. The middle part shows the current $i_1$ for the upper resonant inverter. The lower part shows the difference between the anode and cathode voltages $U_{out,dif}$ and the control deviation $e_{Ur}=U_{soll}U_{out,sum}$.

On the whole, the invention may be summarized in that two proposals are made for power supply systems particularly for X-ray apparatus, comprising at least one resonant inverter and one control unit. According to the first proposal the power supply system includes two inverters and produces two output voltages while the control circuit processes as an actual value, on the one hand, the sum of and on the other hand the difference between the two output voltages. According to the second proposal a control circuit for a power supply system comprising at least one inverter does not directly process the controlled variables, but difference units for controlled variables each time determine the deviations from a previous sampling instant and process these difference values. Also the correcting variable calculated in this manner is a difference value which is recalculated into a correcting variable value by a correcting variable summing unit. The two proposals may advantageously be combined. An interesting further embodiment is proposed to be the use of a limit controller which becomes active with an imminent transgression of a maximum value in the controller and which limits the drive. The control circuit is preferably realized as a digital control circuit for a state space control.

What is claimed is:

1. A power supply system comprising:
   a first and a second inverter for generating switched first and second inverter output voltages, respectively,
   a resonant circuit fed by the inverters, the circuit comprising at least one transformer and at least one resonant capacitor
   first and second resonant circuit output voltages generated on the secondary side of the transformer,
   a control circuit which processes:
      a first actual value that depends on the sum of the first and second resonant circuit output voltages, and
      a second actual value that depends on the difference between the first and second resonant circuit output voltages,
   the control circuit pedefining driving magnitudes as correcting variables for the inverters.

2. A power supply system as claimed in claim 1, in which the control circuit is arranged so that the sum of the first and second resonant circuit output voltages is adjusted to a sum set value, and
   the difference between the first and second resonant circuit output voltages is adjusted to a difference set value.

3. A power supply system as claimed in claim 1, in which the control circuit additionally processes a third resonant circuit and a fourth actual value,
   the third and fourth actual values depending on primary-side resonant currents that flow through the resonant circuit fed by the inverters.

4. A power supply system as claimed in claim 3, in which a parameter is formed for a first and a second resonant capacitance voltage from the primary-side resonant currents by integration and subsequent value formation,
   the third actual value depends on the sum of the resonant capacitance voltages and
   the fourth actual value depends on the difference between the resonant capacitance voltages.

5. A power supply system as claimed in claim 1, in which the control circuit predefines values as driving magnitudes for the inverters, which predefined values each define the duty cycle.

6. A power supply system as claimed in claim 5, in which the control circuit determines a sum and a difference of the predefined values, the driving magnitudes for the inverters being calculated from the sum and difference.

7. A power supply system comprising:

at least one inverter for generating a switched inverter output voltage, a resonant circuit fed by the inverter, the resonant circuit comprising at least one transformer and at least one resonant capacitance at least one output voltage being generated on the secondary side of the transformer, and a control circuit for adjusting the output voltage to a set value, the control circuit delivering driving values for the inverters as correcting variables, the control circuit including:

at least one controlled variable difference unit which determines a difference value, which difference value depends on a difference between a current sample value of a controlled variable and at least one preceding sample value of the controlled variable, a correcting variable difference value being delivered as a correcting variable, and a correcting variable summing unit which unit determines a correcting variable from a preceding correcting variable and the delivered correcting variable difference value.

8. A power supply system as claimed in claim 7, in which the inverter comprises:

means for changing over between a first operating mode and a second operating mode a resonant circuit formed by at least one resonant capacitance and one transformer being active in the first operating mode at the output of the inverter, and a series combination including at least one inductance connected in series to the resonant circuit being active in the second operating mode at the output.

9. A power supply system as claimed in claim 1, in which the control circuit has at least one controlled variable difference unit which determines a difference value between controlled variables, which difference value depends on a difference between the current sample value of a controlled variable and at least one preceding sample value of the controlled variable, and the control circuit delivers a correcting variable difference value as a correcting variable, the control circuit including a correcting variable summing unit which unit determines a correcting variable value which correcting variable value is formed from a preceding correcting variable and the delivered correcting variable difference value.

10. A power supply system as claimed in claim 1, in which the control circuit is a digital control circuit for a state space control.

11. A power supply system as claimed in claim 1, comprising means for limiting a primary-side resonant current.

* * * * *